United States Patent [19]

Kitamura

[11] Patent Number: 4,703,363

[45] Date of Patent: Oct. 27, 1987

[54] APPARATUS FOR SMOOTHING JAGGED BORDER LINES

[75] Inventor: Hideaki Kitamura, Osaka, Japan

[73] Assignee: Dainippon Screen Mfg. Co., Ltd., Kyoto, Japan

[21] Appl. No.: 669,784

[22] Filed: Nov. 9, 1984

[30] Foreign Application Priority Data

Nov. 10, 1983 [JP] Japan .................................. 58-212225

[51] Int. Cl.$^4$ ............................................... H04N 1/40
[52] U.S. Cl. .................................... 358/284; 358/285; 382/55
[58] Field of Search ................... 358/77, 280, 282, 283, 358/284, 285, 287, 293; 382/54, 55, 27; 340/728

[56] References Cited

U.S. PATENT DOCUMENTS

| 3,187,304 | 6/1965 | Taylor | 382/54 |
| 4,437,122 | 3/1984 | Walsh et al. | 358/284 X |
| 4,460,909 | 7/1984 | Bassetti et al. | 358/298 X |
| 4,486,785 | 12/1984 | Lasher et al. | 358/284 |
| 4,506,382 | 3/1985 | Hada et al. | 358/284 X |
| 4,539,704 | 9/1985 | Pastor | 382/55 |
| 4,551,768 | 11/1985 | Tsuchiya et al. | 358/284 X |

FOREIGN PATENT DOCUMENTS

| 52-48929 | 4/1977 | Japan | 340/728 |
| 54-136135 | 10/1979 | Japan | 382/54 |
| 55-114073 | 9/1980 | Japan | 358/284 |
| 59-22764 | 2/1984 | Japan | 340/728 |

Primary Examiner—Edward L. Coles, Sr.
Attorney, Agent, or Firm—Lowe Price LeBlanc Becker & Shur

[57] ABSTRACT

Jagged border lines between image components of a reproduction image or the image of a display are smoothed visually at first by giving weight coefficients to a center pixel and the surrounding pixels thereof, and then by obtaining values for designating middle level densities to be used for the smoothing according to the sum of the coefficients.

17 Claims, 8 Drawing Figures

(a) (b)

(c)

(e) (d)

APPARATUS FOR SMOOTHING JAGGED BORDER LINES

FIELD OF THE INVENTION

This invention relates to an apparatus for smoothing jagged border lines between image components of a reproduction image recorded by using an image reproducing system such as a color scanner or a color displaying monitor, particularly to such an apparatus for smoothing border lines between image components expressed in gradational density (brightness) values carrying a jagged or intermittent (when the border line is a thin enough) appearance.

BACKGROUND OF THE INVENTION

When an inclining line (for example, having the angle $\theta$ expressed by $\tan \theta = 0.25$) must be displayed on a display capable of displaying an image of gradational density (brightness) values, the line has conventionally been expressed as a black-and-white image as shown in FIG. 1, in which the line carries a jagged appearance in the sub-scanning direction (Y).

To smooth such a jagged border line, conventionally so-called a twin beam method is put to practical use. In the method, a line expressed in black-and-white is accompanied by a sub-line expressed in the middle level density (brightness) obtained from a computation when they are written into an internal memory of a display.

FIG. 2 shows an example of a black-and-white image having the same inclination as the line shown in FIG. 1 displayed on a display by means of the twin beam method.

Assuming that each of beam dots a, b, c, d . . . composing the inclining line (called a "main line" hereinafter) shown in FIG. 1 has a brightness level of 5 (this number means the highest brightness), in the twin beam method shown in FIG. 2, some of the brightness of each beam dot composing the main line is distributed to corresponding one of accompanying sub-beam dots a', b', c', d' . . . depending on the inclination and the position of each beam dot. In this, the brightness level $\sigma$ of a main beam dot and the brightness level $\sigma'$ of its accompanying sub-beam dot amounts to the brightness level of $5 = \sigma + \sigma'$ (for example, if $\sigma = 4$, then $\sigma' = 1$) to smoothe the jagged appearance of the inclining line. The number deposited in each beam dot in FIG. 2 indicates the brightness level thereof.

In the abovementioned twin beam method, the processing for image-reproduction cannot be carried out in realtime, because the computation for determining proper brightness for all the main and sub-beam dots composing a black-and-white image is rather complicated and time-consuming.

In another aspect, in a color scanner for reproducing images on a photosensitive film, characters or drawing lines are usually recorded on the scale of a drawing pixel which corresponds to one severalth of a pictorial pixel (this is called a "high-resolution recording process"). An apparatus for practicing such a high-resolution recording process can produce a reproduction image containing rather smoothed border lines, however, the effect thereof is brought only to designated border lines and to black-and-white image components, not to border lines included in the other pictorial components (such as continuous tone images).

SUMMARY OF THE INVENTION

It is an object of this invention to smooth all the jagged border lines between the image components of an output image by using a simple apparatus.

It is another object of this invention also to carry out smoothing process onto the border line between two image components where the difference of density (brightness) level between them are more than a specific value.

To achieve the above objects, this invention comprises the following functional steps.

At first, the density value of a pixel $I_m$ (called a "center pixel" hereinafter) and the density values of its surrounding pixels are multiplied by weight coefficients respectively to compute a mediate value S of all the (center) pixels. When the value S has a specific relation to a fixed value R, a density value J computed from the value S is output. When both values S and R are not in the specific relation, the density value $V_m$ of the center pixel $I_m$ is output.

In the above, a positive weight coefficient is given to the center pixel while a negative weight coefficient is given to each of the surrounding pixels so as to effect each other (to make the sum be "0"). Purporting to the surrounding pixels, for example the pixels composing a symmetrical cross in the main and the sub-scanning directions intersecting at the center pixel can be adopted.

In embodiments of this invention, output density (brightness) values depends on when $1S > R$, $2 - S > R$ or $3 - S > R$ and $S > R$.

The above and other objects and features of this invention can be appreciated more fully from the following detailed description when read with reference to the accompanying drawings.

PREFERRED EMBODIMENT OF THE INVENTION

Figure 1:
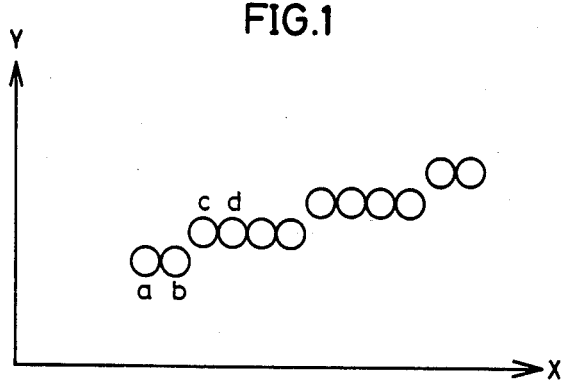
FIG. 1 shows dots composing an inclining line carrying a jagged appearance.
Figure 2:
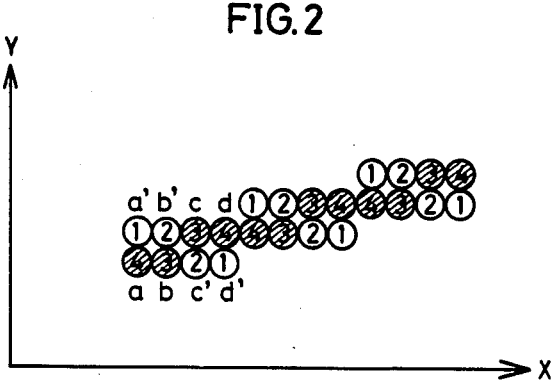
FIG. 2 shows dots composing an inclining line expressed by using a twin beam method.
Figure 3:
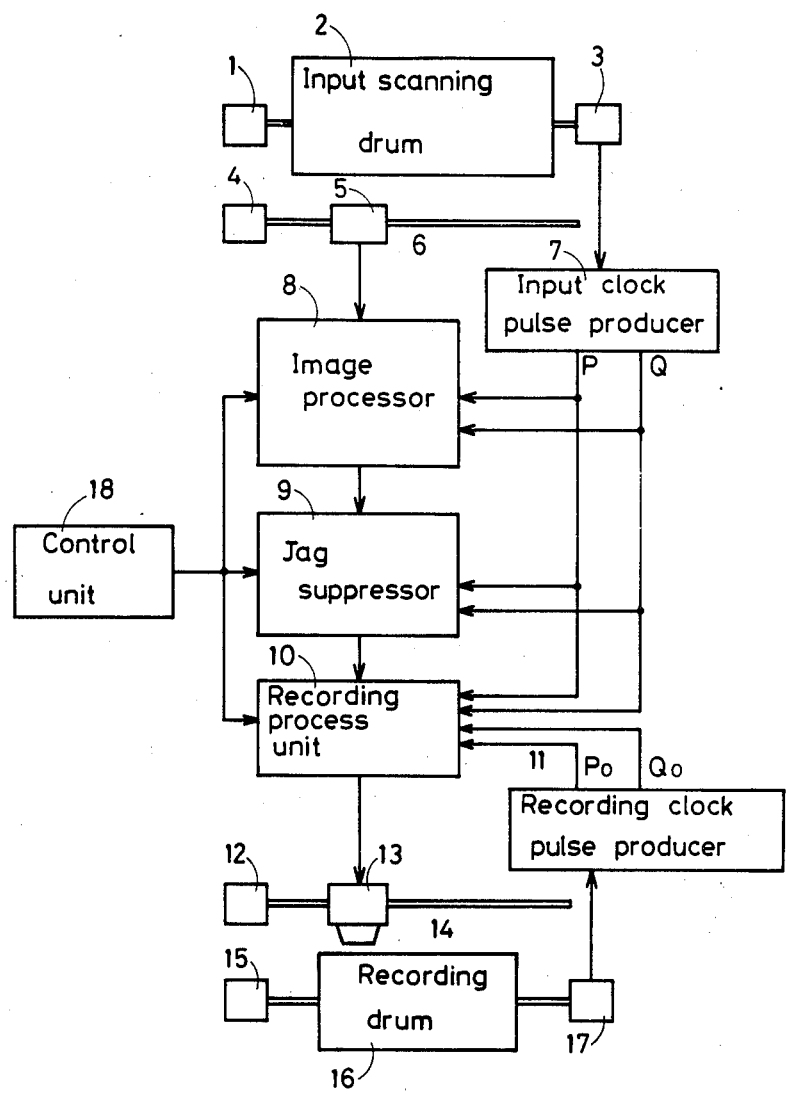
FIG. 3 shows the whole system of this invention.

FIG. 3 shows a color scanner for printing to which the method of this invention is applied. An input scanning drum 2 is revolved by a motor 1, while an original picture mounted on the drum 2 is scanned by an input scanning head 5 which is moved by a motor 4 along a feeding gear 6. Image signals obtained by scanning the original picture undergo analog/digital conversion according to a sampling clock p which is obtained by processing multiple pulse output from a rotary encoder 3 in an input clock pulse producer 7. Thus digitized image signals of three color components R, G and B undergo processes of magnification conversion, RGB/YMCK conversion, gradation correction, color correction, recording mode exchanging, sharpness emphasis and so forth in an image processor 8 under the control of a control unit 18, and then input to a jag suppressor 9. The image signal undergo a jag suppression process of this invention in the jag suppressor 9 and then input to a recording process unit 10 in which the image data are synchronized with a recording clock pulse output from a recording clock pulse producer 11, and used for generating corresponding halftone dot signals. Then the halftone dot signals are used for driving a recording beam of a recording head 13 being moved along a feeding gear 14 by a motor 12 to record a reproduction image onto a photosensitive film mounted on a recording drum 16 being revolved by a motor 15.

In FIG. 3, the input clock pulse producer 7 outputs a sampling clock pulse P and a single pulse Q, while the recording clock pulse producer 11 outputs a recording clock pulse $P_0$ and a single pulse $Q_0$.

Figure 4:
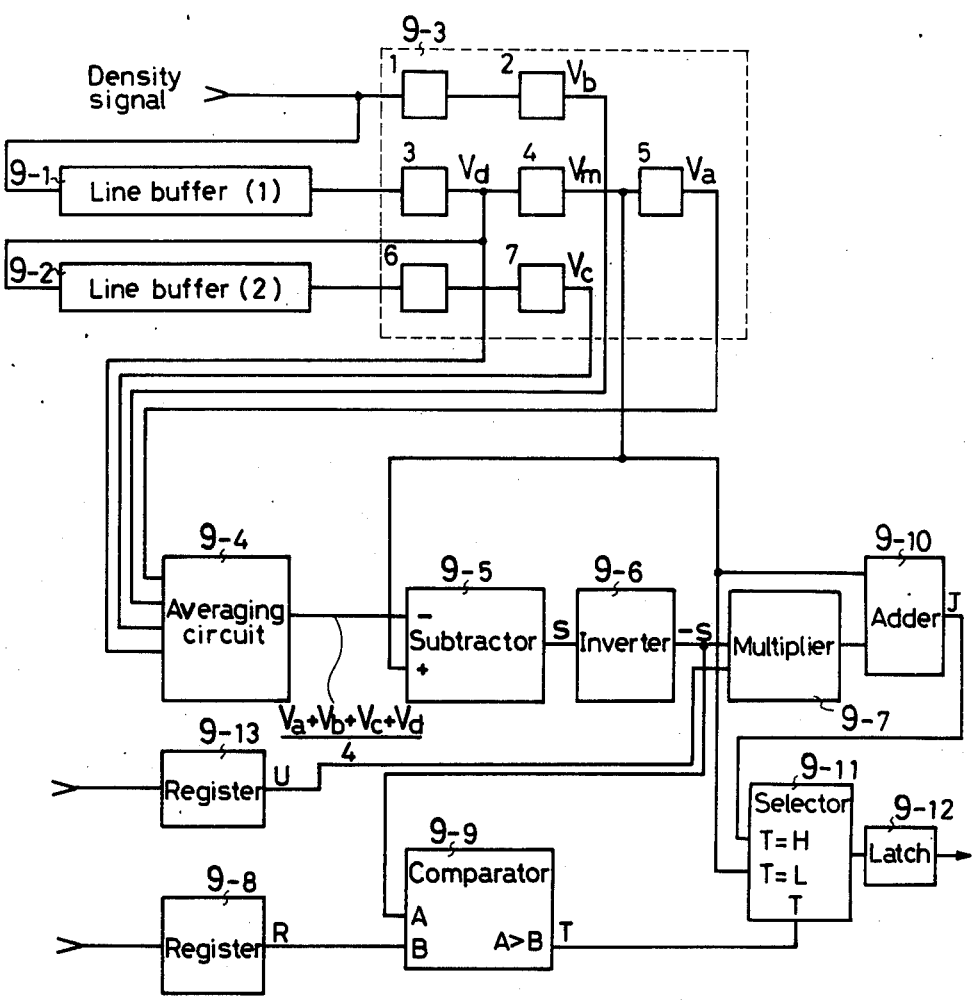
FIG. 4 shows the detail of a jag suppressor of this invention.

FIG. 4 shows the detail of the jag suppressor 9, in which the image data are 8 bit data.

Density signal of a pixel of a scanning line is input to a latch $9_{-3-1}$ synchronizing with the risetime of the clock pulse P, and then the signal is input to corresponding address AS of a line buffer $9_{-1}$ synchronizing with the falltime of the clock pulse P. Before that, the line buffer $9_{-1}$ already output the density signal of the pixel of the previous scanning line stored in the address AS to a latch $9_{-3-3}$. The image data to the latch $9_{-3-3}$ are also input to the address AS of a line buffer $9_{-2}$. Before that, the line buffer $9_{-2}$ already output the density signal of the pixel of the second previous scanning line stored in the address AS to a latch $9_{-3-6}$. Therefore, the image data of the corresponding three pixels situated on three consecutive scanning lines are held on the latches $9_{-3-1}$, $9_{-3-3}$ and $9_{-3-6}$ at the same time. And then they are successively shifted to respective subsequent latches synchronously ($9_{-3-1} \rightarrow 9_{-3-2}$, $9_{-3-3} \rightarrow 9_{-3-4} \rightarrow 9_{-3-5}$; $9_{-3-6} \rightarrow 9_{-3-7}$). Consequently, at every falltime of the clock pulse P, the density value $V_m$ of a center pixel $I_m$ is output from the latch $9_{-3-4}$, and the density values $V_b$ and $V_c$ of the surrounding pixels $I_b$ and $I_c$ (adjoining to the center pixel $I_m$ in the sub-scanning direction) are output from the latches $9_{-3-2}$ and $9_{-3-7}$, while the density values $V_a$ and $V_d$ of the surrounding pixels $I_a$ and $I_d$ (adjoining to the center pixel $I_m$ in the main scanning direction) are output from the latches $9_{-3-5}$ and $9_{-3-3}$.

Figure 8:
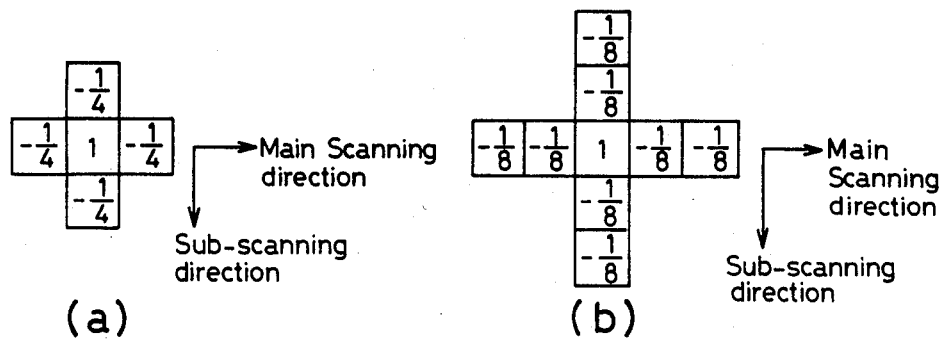
FIG. 8 shows several types of electronic filters composed of weight coefficients.
Figure 8:
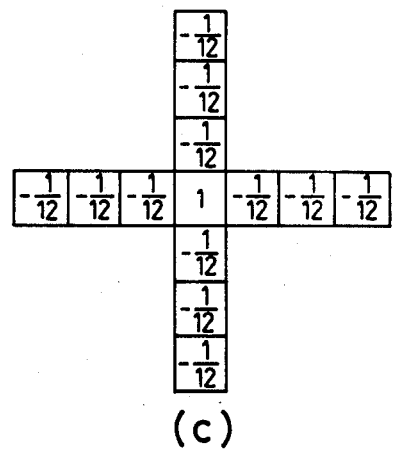
Figure 8:
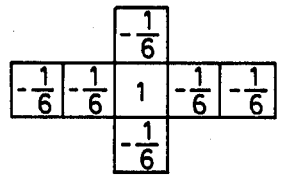

Thus obtained density values $V_a$, $V_b$, $V_c$ and $V_d$ of the surrounding pixels $I_a$, $I_b$, $I_c$ and $I_d$ are input to an averaging circuit $9_{-4}$ to be averaged, which outputs the average value $(V_a+V_b+V_c+V_d)/4$ to the negative terminal of a subtractor $9_{-5}$. On the other hand, the density value $V_m$ of the center pixel $I_m$ is input to the positive input-gate of the subtractor $9_{-5}$. The subtractor carries out a computation:

$$S = V_m - \tfrac{1}{4}(V_a + V_b + V_c + V_d) \qquad (1)$$

wherein the value S is a mediate value for obtaining a middle level density value J (mentioned later). In this, the second term of the right member means that the sum of the density value of each surrounding pixel is multiplied by a weight coefficient of $-\tfrac{1}{4}$ as shown in FIG. 8(a).

Thus obtained mediate value S is inverted in an inverter $9_{-6}$ to be an inverted value $-S$, and output to a multiplier $9_{-7}$. Meanwhile, a specified value U is registered in a register $9_{-13}$ beforehand and is input to the multiplier $9_{-7}$. In the multiplier $9_{-7}$, the inverted value $-S$ is multiplied by the value U and the resultant value is output to an adder $9_{-10}$. The adder $9_{-10}$ adds the resultant value to the value $V_m$ being input from the latch $9_{-3-4}$ to produce the value J:

$$J = V_m + (-S) \cdot U \qquad (2)$$

wherein the value J is a middle level density value to be input to a selector $9_{-11}$.

Said inverted value $-S$ is also input to a comparator $9_{-9}$, to which a fixed value R registered in a register $9_{-8}$ is input beforehand. The comparator $9_{-9}$ compares the value $-S$ to the value R. When $-S > R$, the comparator $9_{-9}$ outputs a selection signal T of "H" (high level) to the selector $9_{-11}$ to make it output the middle level density value J. When $-S \leq R$, the comparator $9_{-9}$ outputs a selection signal T of "L" (low level) to the selector $9_{-11}$ to make it output the value $V_m$ of the center pixel $I_m$. In this manner, the output value of the selector $9_{-11}$ is input via a latch $9_{-12}$ to the recording process unit 10.

Figure 7:
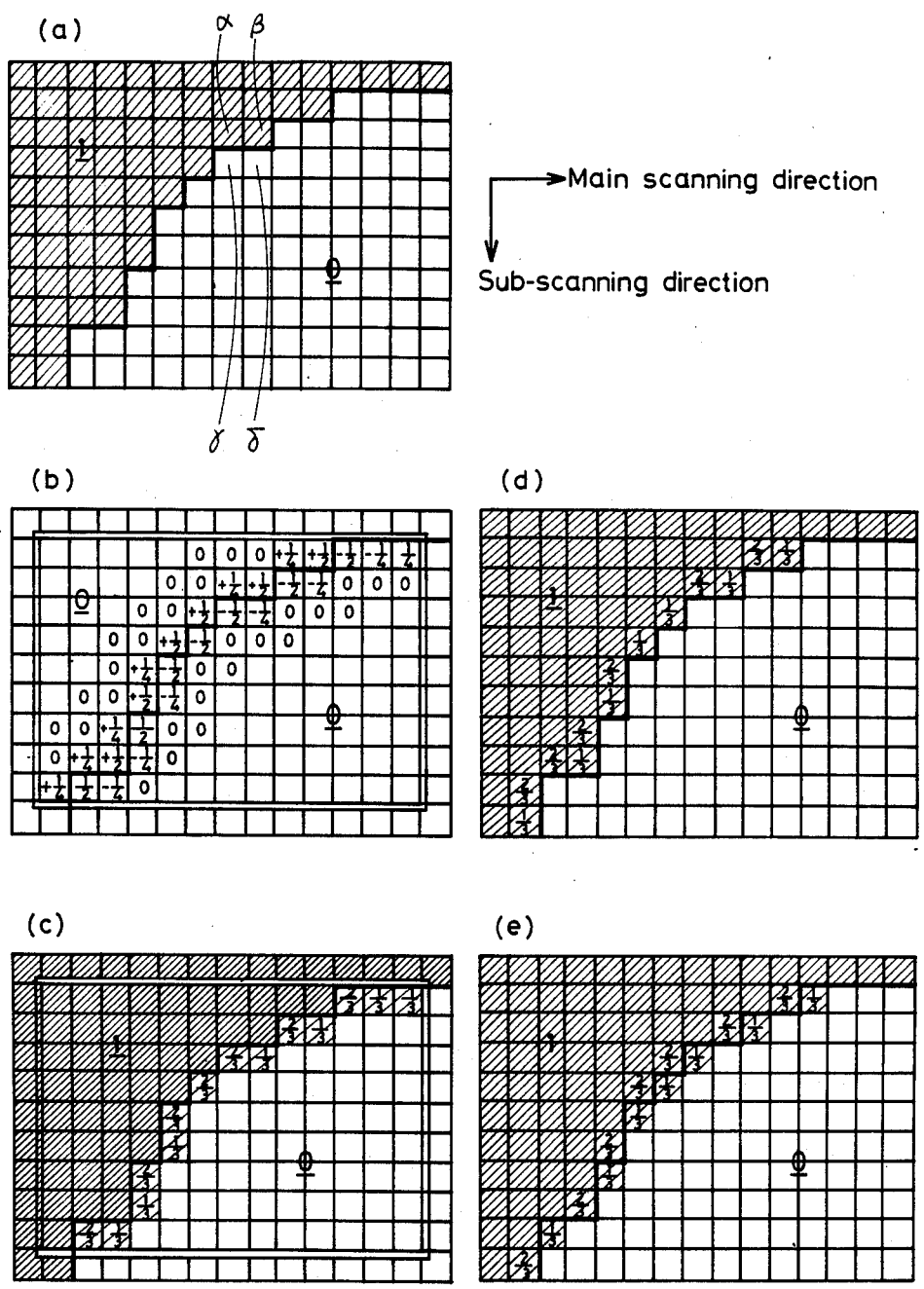
FIG. 7 shows a jag suppression process of this invention.

FIG. 7(a) shows a jagged border line on a conventional black-and-white image (the thick portion is expressed by "black-level ($\underline{1}$)", while the thin portion is expressed by "white-level ($\underline{0}$)").

Under a condition in which the value U to be set up to the register $9_{-13}$ is 4/3, and the value R to be set up to the register $9_{-8}$ is 0, the image of FIG. 7(a) is processed as follows.

The mediate values S ($S_\alpha$, $S_\beta$, $S_{65}$ and $S_\delta$) for pixels $\alpha$, $\beta$, $\gamma$ and $\delta$ of FIG. 7(a) are:

$$S_\alpha = \underline{1} - \tfrac{1}{4} \cdot (\underline{1} + \underline{1} + \underline{0} + \underline{1}) = \tfrac{1}{4} \cdot \underline{1}$$

$$S_\beta = \underline{1} - \tfrac{1}{4} \cdot (\underline{0} + \underline{1} + \underline{0} + \underline{1}) = \tfrac{1}{2} \cdot \underline{1}$$

$$S = \underline{0} - \tfrac{1}{4} \cdot (\underline{0} + \underline{1} + \underline{0} + \underline{1}) = -\tfrac{1}{2} \cdot \underline{1}$$

$$S = \underline{0} - \tfrac{1}{4} \cdot (\underline{0} + \underline{1} + \underline{0} + \underline{0}) = -\tfrac{1}{4} \cdot \underline{1}$$

according to the equation (1), wherein $\underline{1}$ represents the density of black-level and $\underline{0}$ represents the density of white-level, and in this example, $\underline{0}$ is assumed zero.

When the value S is zero or positive ($S \geq 0 = R$), the comparator $9_{-9}$ outputs "L" signal to the selector $9_{-11}$ to make it output the main pixel value $V_m = \underline{1}$. When the value S is negative ($S < 0 = R$), the comparator $9_{-9}$ outputs "H" signal to the selector $9_{-11}$ to make it output the corresponding middle level density value J.

In this, when the value $S = -\tfrac{1}{4} \cdot \underline{1}$, the value J is $J = \underline{0} - (-\tfrac{1}{4} \cdot \underline{1} \times 4/3) = \tfrac{1}{3} \cdot \underline{1}$; when $S = -\tfrac{1}{2} \cdot \underline{1}$, the value J is $J = \underline{1} - (-\tfrac{1}{2} \cdot \underline{1} \times 4/3) = \tfrac{2}{3} \cdot \underline{1}$ according to the equation (2).

When the black-level ($\underline{1}$) corresponds to the density of 100%, the pixel of value $S = -\tfrac{1}{4} \cdot \underline{1}$ is recorded in the density of about 33% ($J = \tfrac{1}{3} \cdot \underline{1}$), while the pixel of value $S = -\tfrac{1}{2} \cdot \underline{1}$ is recorded in the density of about 67% ($J = \tfrac{2}{3} \cdot \underline{1}$). Therefore, an image shown in FIG. 7(c) can be obtained, wherein the jagged appearance on border lines are eased visually.

Figure 5:
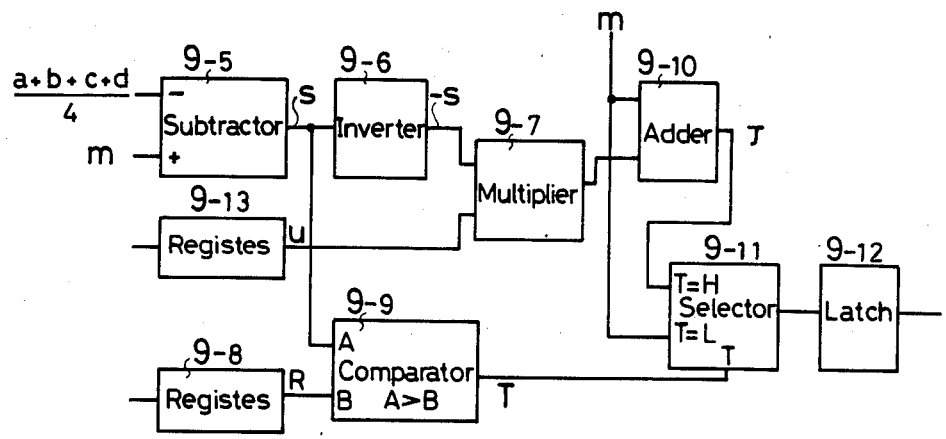
FIG. 5 shows a part of another jag suppressor of this invention.

FIG. 5 shows another embodiment of this invention, from which the data order regulating means and the averaging circuit $9_{-4}$ are eliminated for explanation because they are as same as the embodiment shown in FIG. 4. In the embodiment of FIG. 5, the mediate value S is directly input to the comparator $9_{-9}$ to be compared with the value R. When $S>R$, the selector $9_{-11}$ outputs the middle level density value J. When $S \leq R$, the selector $9_{-11}$ outputs the density value $V_m$ of the center pixel $I_m$.

The black-and-white image of FIG. 7(a) is processed by the circuit of FIG. 5 as in the following way.

The value S has the same value as shown in FIG. 7(b). Assuming that the value R is zero and when $S \leq 0 = R$, the center pixel value $V_m$ (1 or 0) is directly output. When $S > 0 = R$, the middle level density value J is output.

When the black-level (1) corresponds to the density of 100%, the pixel of value $S = \frac{1}{2} \cdot 1$ is recorded in the density of about 33% ($J = \frac{1}{3} \cdot 1$), while the pixel of value $S = \frac{1}{4} \cdot 1$ is recorded in the density of 67% ($J = \frac{2}{3} \cdot 1$). Consequently, the image shown in FIG. 7(d) can be obtained.

Figure 6:
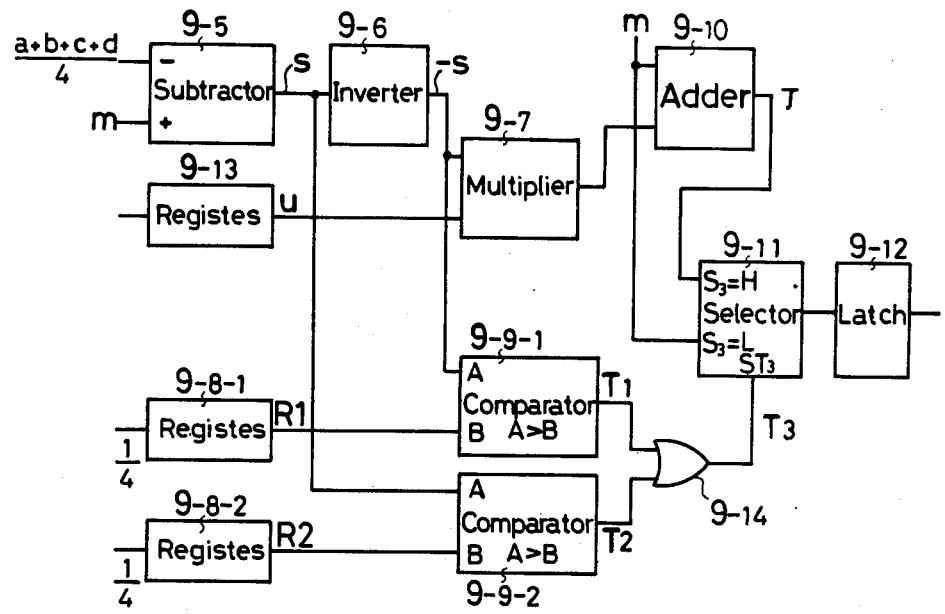
FIG. 6 shows a part of yet another jag suppressor of this invention.

FIG. 6 shows yet another embodiment of this invention, of which circuit structure is a combination of the circuits of FIGS. 4 and 5. That is, a comparator $9_{-9-1}$ compares the inverted value $-S$ obtained from the inverter $9_{-6}$ with a fixed value $R_1$ stored in a register $9_{-8-1}$ and outputs the selection signal $T_1$ of "H" when $-S > R_1$, or outputs the signal $T_1$ of "L" when $-S < R_1$. In the meantime, a comparator $9_{-9-2}$ compares the value S obtained from the subtractor $9_{-5}$ with a fixed value $R_2$ stored in a register $9_{-8-2}$ and outputs the selection signal $T_2$ of "H" when $S > R_2$, or the signal $T_2$ of "L" when $S < R_2$.

Consequently, the selector $9_{-11}$ outputs the density value $V_m$ of the center pixel $I_m$ according to the selection signal of "L" when $-R_1 \leq S \leq R_2$. Or the selector $9_{-11}$ outputs the middle level density value J according to the selection signal of "H" when $R_1 < -S$ or $S > R_2$.

When the image of FIG. 7(a) is processed by the circuit of FIG. 6, the value S of each pixel is as shown in FIG. 7(b). Assuming that the values U, $R_1$ and $R_2$ are $U = \frac{2}{3}$ and $R_1 = R_2 = \frac{1}{4}$, a selection signal $T_3$ from a OR-gate $9_{-14}$ becomes "L" when the pixel of which value S is $S = 0$ or $S = \pm \frac{1}{4} \cdot 1$ is processed to make the selector output the density value $V_m$ of the center pixel $I_m$. When the pixel of which value S is $S = \pm \frac{1}{2} \cdot 1$ is processed, the signal $T_3$ becomes "H" to make the selector output the middle level density value J. The value J becomes $J = \frac{1}{3} \cdot 1$ for the pixel of which value S is $S = -\frac{1}{2} \cdot 1$, or becomes $J = \frac{2}{3} \cdot 1$ for the pixel of which value S is $S = +\frac{1}{2} \cdot 1$ as shown in FIG. 7(e).

In the circuit of FIG. 6, when the image of FIG. 7(a) is processed under a condition in which the value U, $R_1$ and $R_2$ are $U = 4/3$, $R_1 = 0$ and $R_2 = 1$, the image of FIG. 7(c) is recorded. When the image of FIG. 7(a) is processed under a condition in which the value U, $R_1$ and $R_2$ are $U = 4/3$, $R_1 = 1$ and $R_2 = 0$, the image of FIG. 7(d) is recorded. Therefore, by varying the values U, $R_1$ and $R_2$, the position of a border line can be shifted. When the portion of black-level "1" is a ruled line, the thickness thereof can be varied.

When the image of FIG. 7(a) is processed by the circuit of FIG. 6 under a condition wherein $U = 4/3$, $R_1 = 0$, and $R_2 = 0$, the middle density value J becomes $J = 5/6 \cdot 1$, $J = \frac{2}{3} \cdot 1$, $J = \frac{1}{3} \cdot 1$ and $J = 1/6 \cdot 1$ when the pixels of which values S are $S = \frac{1}{4} \cdot 1$, $S = \frac{1}{2} \cdot 1$, $S = -\frac{1}{2} \cdot 1$ and $S = -\frac{1}{4} \cdot 1$ respectively. That is, when the value J takes more minute value as mentioned above, the border line recorded under the condition is smoothed more than the border lines of the images shown in FIGS. 7(c)(d) and (e). Therefore, by varying the values U, $R_1$ and $R_2$, a desired density gradient can be obtained.

The abovementioned circuits adopt a cross-shape electronic filter in which the center pixel is given the weight coefficient of 1 while each of four surrounding pixels are given that of $-\frac{1}{4}$ as shown in FIG. 8(a).

As is obvious from the above example, the weight coefficient of the center pixel and the sum of the coefficients of the surrounding pixels offset each other, which fact can pass for any electronic weight coefficient filters of this invention.

FIG. 8(b) shows another cross-shape imagenary filter in which the center pixel is given the weight coefficient of 1, while each of four surrounding pixels situated in the main scinning direction and four surrounding pixels situated in the sub-scanning direction symmetrically about the center pixel is given a weight coefficient of $-\frac{1}{8}$. FIG. 8(c) shows another cross-shape electronic filter in which the center pixel is given the weight coefficient of 1, while each of six surrounding pixels situated in the main scanning direction and six surrounding pixels situated in the sub-scanning direction symmetrically about the cinter pixel is given a weight coefficient of $-1/12$.

FIG. 8(d) shows another cross-shape imaginary filter in which the center pixel is given the weight coefficient of 1, while each of two surrounding pixels situated in the main scanning direction and four surrounding pixels situated in the sub-scanning direction symmetrically about the center pixel is given a weight coefficient of $-1/6$.

Generally speaking, when twenty five pixels $a_1$ to $a_{25}$ arranged in matrix as shown in FIG. 8(e) are to be given weight coeficients, the weight coefficient for the center pixel $a_{13}$ and the sum of the weight coefficient for surrounding pixels $a_1 \ldots a_{12}, a_{14} \ldots a_{25}$ must offset each other (amount to zero).

When the difference of density between the portion of black-level "1" and that of the portion of white-level "0" as shown in FIG. 7(a) is little, no preventive measures need not be taken for the appearance of jagged border lines. In such a case, by using the circuit as shown in FIG. 6 under a condition in which the values U, $R_1$ and $R_2$ are $U = 2/3$, $R_1 = \frac{1}{2}$ and $R_2 = \frac{1}{2}$, the selector $9_{-11}$ can output a signal of the same image as FIG. 7(a).

When said difference of density is little enough, it would rather be necessary to carry out a sharpness emphasis on the border line by the image processor 8 than to carry out the jag suppression process thereto.

As mentioned above, a portion of less contrast of density had better undergo the sharpness emphasis process, while a portion of more contrast of density had better undergo the jag suppression process to improve the quality of an image to be reproduced.

Although in the abovementioned embodiment, the sharpness emphasis process is carried out previously in the image processor 8 before the jag suppression process, the order can also be reversed.

The method of this invention can be applied to a displaying monitor as well as to the abovementioned image reproducing system.

The method of this invention is capable of realizing a jag suppression process and smoothing process by means of a simple apparatus and algorithm, which have conventionally been very complicated. Therefore, when the method of this invention is applied to a displaying monitor, an economical displaying monitor of high resolution power can be realized. When it is applied to an image reproducing system, an economical image reproducing system capable of suppressing the appearance of jagged or intermittent lines can be obtained.

I claim:

1. A method for smoothing a jagged border line between image components of a reproduction image, comprising the steps of:
    (a) obtaining a sum S of a density value of a center pixel to which a positive weight coefficient is given and density values of its surrounding pixels to which negative weight coefficients are given;
    (b) obtaining a value J according to the sum S;
    (c) comparing the sum S with a predetermined fixed value R;
    (d) selecting one of a density value $V_m$ of a center pixel $I_m$ and the value J obtained in the step (b) depending on a result of step (c) and providing the related density value to said center pixel; and
    (e) repeating steps (a)–(d) for another center pixel to smooth the border line.

2. A method claimed in claim 1 in which the surrounding pixels comprise an arbitrary number of pixels which form a cross having components lying respectively in main and sub-scanning directions and intersecting at the center pixel.

3. A method claimed in claim 1 in which the number of the surrounding pixels in the main scanning direction is the same as that of the surrounding pixels in the sub-scanning direction.

4. A method claimed in claim 3 in which the number of the surrounding pixels in the main scanning direction is 2 and the number of the surrounding pixels in the sub-scanning direction is 2.

5. A method claimed in claim 1 in which a positive weight coefficient given to the center pixel and the sum of the negative weight coefficients given to a surrounding pixels offset each other.

6. A method claimed in claim 1 in which the weight coefficient for the center pixel is 1 and the weight coefficient for each of four surrounding pixels composed of two pixels in a main scanning direction and two pixels in a sub-scanning direction symmetrical about the center pixel $I_m$, is $-\frac{1}{4}$.

7. A method claimed in claim 1 in which the value J is derived from subtracting the product of the value S and a specified value U from the density value $V_m$ of the center pixel $I_m$.

8. A method claimed in claim 1 in which the value J is output when the value S is greater than the fixed value R and the value $V_m$ is output when the value S is equal to or smaller than the value R.

9. A method claimed in claim 1 in which the value J is output when the inverted value $-S$ is greater than the fixed value R and the value $V_m$ is output when inverted value $-S$ is equal to or smaller than the value R.

10. A method claimed in claim 1 in which the value J is output when the inverted value $-S$ of the value S is greater than the value $R_1$ or when the value S is greater than the value $R_2$, and the value $V_m$ is output when the inverted value $-S$ of the value S is equal to or smaller than the value $R_1$ or the value S is equal to or smaller than the value $R_2$.

11. A system for smoothing a jagged border line between image components of a reproduction image, comprising:
    (i) means for scanning pixels of the reproduction image and for defining center pixels of a border between image components;
    (ii) first means for obtaining a sum S of density values given to each center pixel and to surrounding pixels thereof;
    (iii) second means for obtaining a value J according to the sum S;
    (iv) comparator means for comparing the sum S with a fixed value R; and
    (v) a third means responsive to said comparator means for selecting one of a density value $V_m$ of the center pixel $I_m$ and the value J to be provided to said center pixel to smooth the border line.

12. A system claimed in claim 11 in which the first means comprises:
    (i) an averaging circuit which computes the average of the weight coefficient given to each of the surrounding pixels, said surrounding pixels comprising pixels of the same number in both main and the sub-scanning directions symmetrical about the center pixel; and
    (ii) a subtracting circuit which subtracts the averaged value from the density value $V_m$ of the center pixel $I_m$.

13. A system claimed in claim 12 in which the averaging circuit is a circuit for obtaining an average of the weight coefficients given to a of two by two array of said surrounding pixels.

14. A system claimed in claim 11 in which the second means comprises:
    (i) a multiplying circuit for multiplying a value $-S$ obtained by inverting the sum S and a specified value U to obtain a value $-S.U$; and
    (ii) an adding circuit for adding the obtained value $-S.U$ to the value $V_m$ of the center pixel $I_m$.

15. A system claimed in claim 11 in which the third means includes means for outputting one of an value J when the inverted value $-S$ is greater than the value R, and the value $V_m$ of the center pixel $I_m$ when the inverted value $-S$ is equal to or smaller than the value R.

16. A system claimed in claim 11 wherein the third means includes means to output one of (i) the value J when the value S is greater than the value R, and (ii) the value $V_m$ of the center pixel $I_m$ when the value S is equal to or smaller than the value R.

17. A system claimed in claim 16 wherein the third means includes means to output the value J when an inverted value $-S$ is greater than a fixed value $R_1$ or when the value S is greater than a fixed value $R_2$, or (ii) the value $V_m$ of the center pixel $I_m$ when the inverted value $-S$ is equal to or smaller than the value $R_1$ or when the value S is equal to or smaller than the value $R_2$.

* * * * *